United States Patent
Lee et al.

(10) Patent No.: US 12,073,553 B2
(45) Date of Patent: Aug. 27, 2024

(54) IMAGE-BASED JIG INSPECTION SYSTEM AND METHOD

(71) Applicants: Hyundai Motor Company, Seoul (KR); Kia Motors Corporation, Seoul (KR); AJIN Industrial Co., Ltd., Gyeongsangbuk-do (KR); AUTOIT, Daegu (KR)

(72) Inventors: Daewon Lee, Gyeonggi-do (KR); Ki Hoon Park, Gyeonggi-do (KR); Myunghwan Jeong, Seoul (KR); Byoungik Kim, Gyeongsangbuk-do (KR); Hyuk-Ju Kwon, Gyeongsangbuk-do (KR); Soo Young Ha, Gyeongsangbuk-do (KR)

(73) Assignees: Hyundai Motor Company, Seoul (KR); Kia Motors Corporation, Seoul (KR); AJIN Industrial Co., Ltd., Gyeongsangbuk-do (KR); AUTOIT, Daegu (KR)

( * ) Notice: Subject to any disclaimer, the term of this patent is extended or adjusted under 35 U.S.C. 154(b) by 595 days.

(21) Appl. No.: 17/110,912

(22) Filed: Dec. 3, 2020

(65) Prior Publication Data
US 2021/0304382 A1     Sep. 30, 2021

(30) Foreign Application Priority Data
Mar. 26, 2020   (KR) .................. 10-2020-0036653

(51) Int. Cl.
*G06T 7/20*     (2017.01)
*B23K 37/04*    (2006.01)
(Continued)

(52) U.S. Cl.
CPC ............. *G06T 7/001* (2013.01); *G06T 7/20* (2013.01); *G06T 7/90* (2017.01); *H04N 23/695* (2023.01);
(Continued)

(58) Field of Classification Search
None
See application file for complete search history.

(56) References Cited

U.S. PATENT DOCUMENTS 5,107,447 A * 4/1992 Ozawa ................ G01R 15/142
                                                    324/544
11,415,867 B1 * 8/2022 Cicerone ............. F16M 11/123
(Continued)

FOREIGN PATENT DOCUMENTS

CN     210898858 U  *  6/2020
CN     115635272 A  *  1/2023
(Continued)

OTHER PUBLICATIONS

Machine Vision in the Automotive Industry, https://www.automate.org/industry-insights/machine-vision-in-the-automotive-industry (Year: 2006).*

*Primary Examiner* — Randolph I Chu
(74) *Attorney, Agent, or Firm* — Fox Rothschild LLP

(57) ABSTRACT

An image-based jig inspection system for inspecting a state of a sensorless jig managed in a vehicle body factory includes: a jig configured to fix a vehicle body component mounted by a plurality of clamping units; a camera module configured to photograph an inspection image of the jig; a vision system configured to compare the inspection image with a predetermined image analysis reference to determine a forward moving state or a backward moving state of a respective one of the clamping units; a welding robot configured to weld the component; and a main controller configured to control the welding robot according to a (Continued)

predetermined process based on the state information of the respective one of the clamping units.

14 Claims, 10 Drawing Sheets

(51) Int. Cl.
  *G06T 7/00*       (2017.01)
  *G06T 7/90*       (2017.01)
  *H04N 23/695*     (2023.01)
  *B25J 11/00*      (2006.01)
  *H04N 23/698*     (2023.01)

(52) U.S. Cl.
  CPC ......... *B23K 37/0443* (2013.01); *B25J 11/005* (2013.01); *G06T 2200/24* (2013.01); *G06T 2207/10024* (2013.01); *G06T 2207/30164* (2013.01); *H04N 23/698* (2023.01)

(56) References Cited

U.S. PATENT DOCUMENTS

| | | | |
|---|---|---|---|
| 11,415,990 B2 * | 8/2022 | Das | G06T 7/246 |
| 2014/0204015 A1 * | 7/2014 | Lee | G06V 40/107 |
| | | | 345/156 |
| 2016/0193700 A1 * | 7/2016 | Hasegawa | B23K 37/0435 |
| | | | 228/212 |
| 2016/0335484 A1 * | 11/2016 | Xie | H04N 7/181 |
| 2017/0231708 A1 * | 8/2017 | Mohika | A61B 17/0487 |
| | | | 24/132 WL |
| 2021/0304382 A1 * | 9/2021 | Lee | G06T 7/20 |
| 2022/0334454 A1 * | 10/2022 | Veit | A61B 1/0684 |
| 2023/0117932 A1 * | 4/2023 | Geiger | G06V 10/764 |
| | | | 706/12 |

FOREIGN PATENT DOCUMENTS

| | | | | |
|---|---|---|---|---|
| CN | 218424244 U | * | 2/2023 | |
| JP | 2020179496 A | * | 11/2020 | ............ B23K 20/10 |
| KR | 20090046632 A | * | 5/2009 | |
| WO | WO-2022138234 A1 | * | 6/2022 | |

* cited by examiner

FIG. 8

⟨Image determining table⟩

| Image state | Forward moving template matching rate | Backward moving template matching rate | Forward moving determining reference value | Backward moving determining reference value | Determining |
|---|---|---|---|---|---|
| Forward moving image | 96% | 65% | 80% | 80% | Forward moving state |
| Backward moving image | 65% | 96% | 80% | 80% | Backward moving state |
| Forward/backward moving image | 65% | 65% | 80% | 80% | Error (template defect) |
| Forward/backward moving image | 96% | 96% | 80% | 80% | Error (template defect) |

IMAGE-BASED JIG INSPECTION SYSTEM AND METHOD

CROSS-REFERENCE TO RELATED APPLICATION

This application claims under 35 U.S.C. § 119 the benefit of Korean Patent Application No. 10-2020-0036653 filed in the Korean Intellectual Property Office on Mar. 26, 2020, the entire contents of which are incorporated herein by reference.

BACKGROUND

(a) Technical Field

The present disclosure relates to an image-based jig inspection system and an inspection method, more particularly, to the image-based jig inspection system and method for determining a state of a clamping unit of a jig fixing a vehicle body.

(b) Description of the Related Art

In general, a vehicle body factory is equipped with a jig that fixes components to a correct position for assembling a vehicle body and a welding robot that welds the fixed components, and welding work is performed according to a process of a main control center that controls them.

According to the process, the jig and the robot are connected to a programmable logic controller (PLC) of the main control center and must transmit respective state information in real time.

For example, in the jig, a plurality of clamping units to fix the components to a base are disposed, and each clamping unit operates forward/backward clampers rotatably installed on a hinge shaft through a cylinder to fix or release the components. In particular, a state in which the cylinder of the clamping unit is moving forward and fixing a respective component is referred to as clamping, and a state in which the cylinder is moving backward and releasing the respective component may be referred to as unclamping. In each clamping unit, two sensors for measuring the cylinder's forward state (the clamping) and the backward state (the unclamping) are attached. Two sensors are connected to the main control center through a cable and transmit the state information of the clamping unit.

Typically, these jigs have about 30-40 clamping units, so about 60-80 sensors are installed in one jig. If the number of sensors increases, it is possible to accurately detect a state of a jig, but there is a problem in that the size of the PLC card increases, so there is insufficient space and possible interference between equipment increases.

In addition, in recent years, as jigs are manufactured to be applicable to multiple vehicle types produced in factories, there is a problem of increased sensor cost and a wiring cost due to an increase in the number of installations of clamping units.

In addition, sensor cables may be exposed to welding work, resulting in cable damage or fire due to spatter, and in a case of a contact failure such as with connectors that connect multiple cables, there is a problem that a line operation rate is reduced due to a recovery time due to the complex cables.

The above information disclosed in this Background section is only for enhancement of understanding of the background of the disclosure, and therefore it may contain information that does not form the prior art that is already known in this country to a person of ordinary skill in the art.

SUMMARY

An exemplary embodiment of the present disclosure relates to an image-based jig inspection system and an inspection method for monitoring a state of a clamping unit of a jig fixing a vehicle body in real time through image sensing using a camera.

According to one aspect of the present disclosure, an image-based jig inspection system for inspecting a state of a sensorless jig managed in a vehicle body factory according to an exemplary embodiment of the present disclosure includes: a jig configured to fix a vehicle body component mounted by a plurality of clamping units; a camera module configured to photograph an inspection image of the jig; a vision system configured to compare the inspection image with a predetermined image analysis reference to determine a forward moving state or a backward moving state of a respective one of the clamping units; a welding robot configured to weld the component; and a main controller configured to control the welding robot according to a predetermined process based on state information of the respective one of the clamping units.

The jig may include: the plurality of clamping units disposed on an upper surface of a base; a programmable logic controller (PLC) controlling the component aligned to the clamping unit to be fixed or released; and a carriage on which the base is movably mounted.

In addition, the jig may dispose the clamping unit designed to mount a component of multiple vehicle types, and each clamping unit may be painted with a unique color according to the vehicle type of the component used.

The camera module may include: a camera installed at a vertical position from the jig and photographing an image of the jig; a rotation stage rotating and fixing the camera with a predetermined rotation angle; a tilting stage connecting between the rotation stage and the camera and adjusting a tilting angle of the camera; and a measuring device measuring the rotation angle and the tilting angle of the camera and storing the rotation angle and the tilting angle of the camera to a memory.

The camera may be provided with a plurality of image sensors according to the size of the jig, or the number of image sensors may be expanded in a predetermined direction to support wide photographing.

The vision system may include: a communication module receiving an inspection image photographed by the camera module; an image processing module extracting shape information of the clamping unit from the inspection image received from the communication module and comparing the shape information of the clamping unit and predetermined reference template information in the image analysis reference to calculate a forward moving matching rate and a backward moving matching rate of the clamping unit; and a determining module for determining a forward moving state or a backward moving state of the clamping unit by detecting that one of the forward moving matching rate and the backward moving matching rate exceeds a predetermined reference value.

The image processing module may set an image analysis reference including at least one of: a vehicle type for each clamping unit, a reference color for each clamping unit, an image region for each clamping unit, template information defined in the image region, a camera ID, or a jig position by obtaining the reference image of the jig in advance.

The image processing module may generate an integrated reference image by matching a first half image and a second half image of the jig photographed by a plurality of cameras.

The image processing module may match the vehicle type and the component used for each color of the clamping unit in the reference image through a template authoring tool UI and set the image region for each clamping unit.

The image processing module may filter the image region to remove a background, and may extract the contour of the clamping unit.

The image processing module may derive the shape information of the clamping unit based on the contour and generate the template information including the forward moving state template and the backward moving state template.

The image processing module may calculate each matching rate by comparing the template information corresponding to the shape information of the clamping unit on a pixel-to-pixel basis.

The image processing module may calculate the matching rate while overlapping and moving the template information on the image region, and may transfer the forward moving matching rate and the backward moving matching rate with maximum values to the determine module.

The determining module may determine as the forward moving state if the forward moving matching rate exceeds the forward moving determining reference value and the backward moving matching rate does not exceed the backward moving determining reference value, and may determine as the backward moving state if the backward moving matching rate exceeds the backward moving determining reference value and the forward moving matching rate does not exceed the forward moving determining reference value.

The determining module may determine that an error occurs when the forward moving matching rate and the backward moving matching rate both exceed the forward moving and backward moving determining reference values or both do not exceed the forward moving and backward moving determining reference values.

On the other hand, according to one aspect of the present disclosure, an image-based jig inspection method as a method for inspecting a state of a sensorless jig based on an image through a vision system equipped to a process line of a vehicle body factory includes: a) setting an image analysis reference including at least one of an application vehicle type and component for each clamping unit, a color of a clamping unit, an image region of a clamping unit, template information defined in the image region, a camera ID, or a jig position by obtaining the reference image for each type of a jig in advance; b) identifying an inspection target component according to an inspection request received from a main controller and selecting the image analysis reference corresponding to the component; c) obtaining the inspection image of the jig photographed in the camera module to extract a clamping unit image corresponding to the image region of the inspection target component from the selected image analysis reference; and d) comparing the clamping unit image with the template information defined in the image analysis reference to determine the forward moving state or backward moving state of the clamping unit to be transmitted to the main controller.

The step c) may include: comparing a color of the clamping unit image and the clamping unit color of the image analysis reference; and generating an inspection error event to be notified to the main controller if two colors are different.

The step c) may include filtering the image region to remove a background and extracting the contour of the clamping unit.

The step d) may include: calculating a forward moving template matching rate and a backward moving template matching rate, respectively, by comparing the forward moving template and the backward moving template corresponding to the contour of the clamping unit; and determining a state of the clamping unit by detecting whether either one of the forward moving template matching rate and the backward moving template matching rate exceeds a predetermined reference value.

In the step d), if both the forward moving template matching rate and the backward moving template matching rate exceed the reference value or both do not exceed the reference value, it may determined that an error occurs in the corresponding template and an alarm may be sent to the main controller.

BRIEF DESCRIPTION OF THE DRAWINGS

FIG. 8 is a view showing an image determining table according to an exemplary embodiment of the present disclosure.

DETAILED DESCRIPTION OF THE EMBODIMENTS

Figure 1:
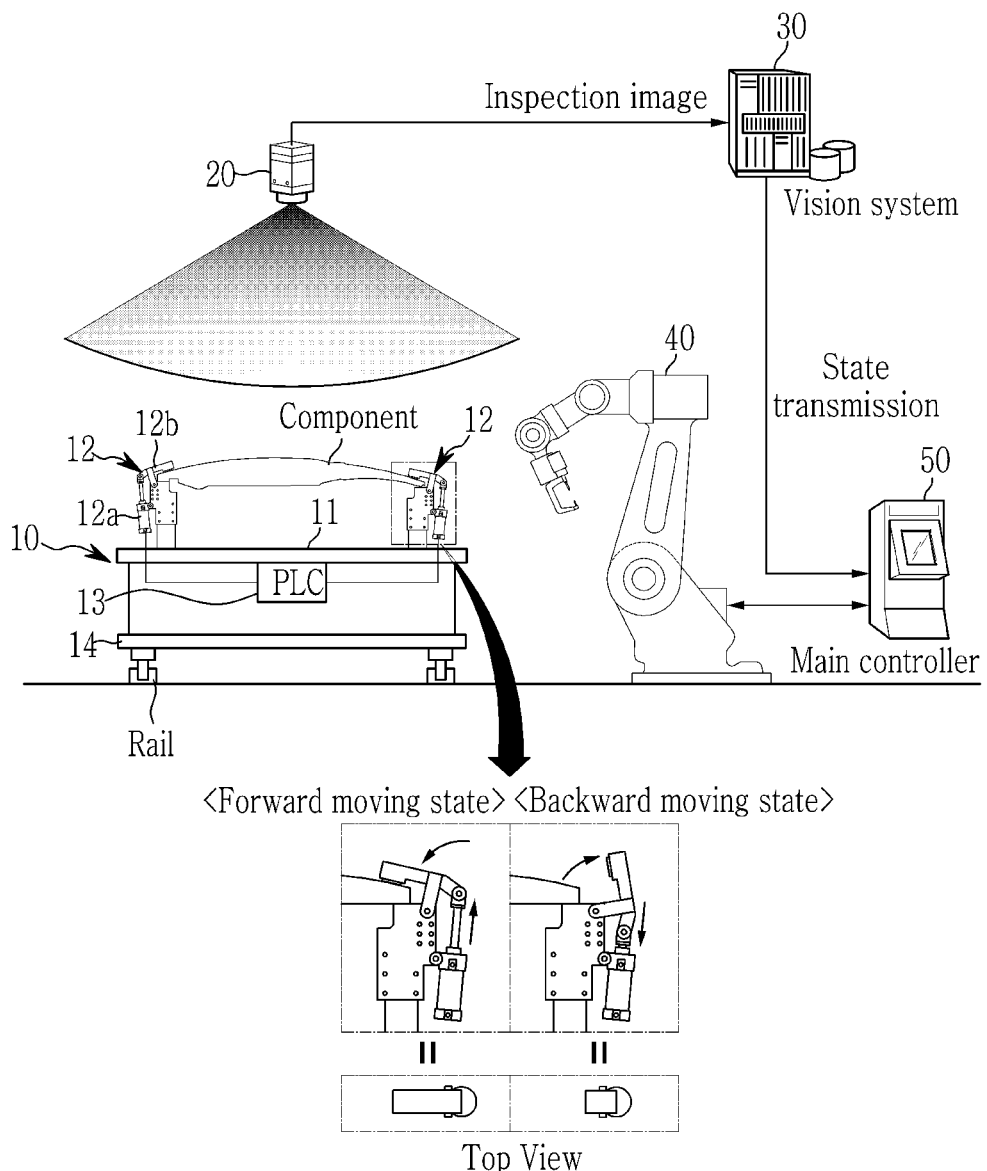
FIG. 1 is a schematic view showing an image-based jig inspection system according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

Throughout the specification, terms such as "first", "second", "A", "B", "(a)", "(b)" etc. may be used to describe various elements, but the elements should not be limited by the terms. These terms are used only to differentiate the components from other components, but the nature, sequence, order, etc. of the corresponding components are not limited by these terms.

Also, in this specification, it is to be understood that when one component is referred to as being "connected" or "coupled" to another component, it may be connected or coupled directly to the other component or may be connected or coupled to the component with another component intervening therebetween. On the other hand, in this specification, it is to be understood that when one component is referred to as being "connected or coupled directly" to another component, it may be connected or coupled to the other component without another component intervening therebetween.

Terms used in the present specification are used only to describe specific exemplary embodiments, and are not intended to limit the present disclosure. Singular expressions used herein include plural expressions unless they have definitely opposite meanings in the context.

Now, an image-based jig inspection system according to an exemplary embodiment of the present disclosure is described in detail with reference to the drawings.

FIG. 1 is a schematic view of an image-based jig inspection system according to an exemplary embodiment of the present disclosure.

Referring to FIG. 1, an image-based jig inspection system according to an exemplary embodiment of the present disclosure includes a jig 10 configured to fix a vehicle body component mounted by a plurality of clamping units, a camera module 20 configured to photograph an inspection image of the jig 10 at a predetermined fixing position, a vision system 30 configured to determine a forward moving state or a backward moving state of a clamping unit 12 by comparing an inspection image obtained from the camera module 20 with a predetermined image analysis reference, a welding robot 40 configured to weld the component, and a main controller 50 configured to control the welding robot 40 according to a predetermined process based on the state of the clamping unit 12.

The jig 10 may include the clamping unit 12 disposed in plural on an upper surface of a base 11 and a PLC 13 controlling the clamping unit 12 to fix (clamp) or release a component aligned with the clamping unit 12. The component may be a floor, a roof, and a side (a door), and the like constituting the vehicle body, and for convenience, a side door is described as an example.

The base 11 may be mounted on a movable carriage 14. The jig 10 according to an exemplary embodiment of the present disclosure may be implemented as a sensorless jig 10 in which a complex sensor and a cable for detecting the operating state of the clamping unit 12 pointed out as a conventional problem are omitted.

The clamping unit 12 includes a cylinder 12a operating a rod with a forward movement or a backward movement according to the control of the PLC 13, and a clamper 12b installed to be rotatable around a hinge axis and fixing or releasing the component according to the forward/backward movement operations of the rod. Hereinafter, the state in which the cylinder 12a of the clamping unit 12 moves forward and the clamper 12b fixes the component is called "a forward moving state", and the state in which the cylinder 12a moves backward and releases the component is called "a backward moving state".

The jig 10 may be a dedicated jig that fixes the component for one vehicle type, or a multiple vehicle type of jig that may selectively mount the component applied to multiple vehicle types.

Hereinafter, in a vehicle body factory according to an exemplary embodiment of the present disclosure, the multiple vehicle type of jig 12 in which the components of multiple vehicle types may be assembled in a process line is described.

A plurality of clamping units 12 designed to align the components of multiple vehicle types are disposed on the jig 12. Each clamping unit 12 is painted with its own color (e.g., green, red, blue, yellow, etc.) for each vehicle type of the used component. In addition, the PLC 13 is equipped with a control line that may control the clamping units 12 grouped by the vehicle type.

In an exemplary embodiment of the present disclosure, the components for each vehicle type may be easily identified through the color painted on clamping unit 12, and the state of the clamping unit 12 may be easily monitored and controlled through the camera module 20 and the vision system 30.

When the component is loaded on the jig 12, the clamping unit 12 applied to the corresponding component by the PLC 13 is operated to fix the component, and the welding process for the fixed component is performed. In the processes of loading the components onto the jig 12 or welding the components, the state of the clamping unit 12 must be detected before and after each predetermined process is performed. For example, the state of the clamping unit 12 may be checked before and after loading the component onto the jig 12, before and after the operation of the clamping unit 12, and before and after the welding of the component using the welding robot 40.

The camera module 20 is fixedly installed on the vertical upper part from the jig 10 and photographs the image of the component fixed through a plurality of clamping units 12.

Figure 2:
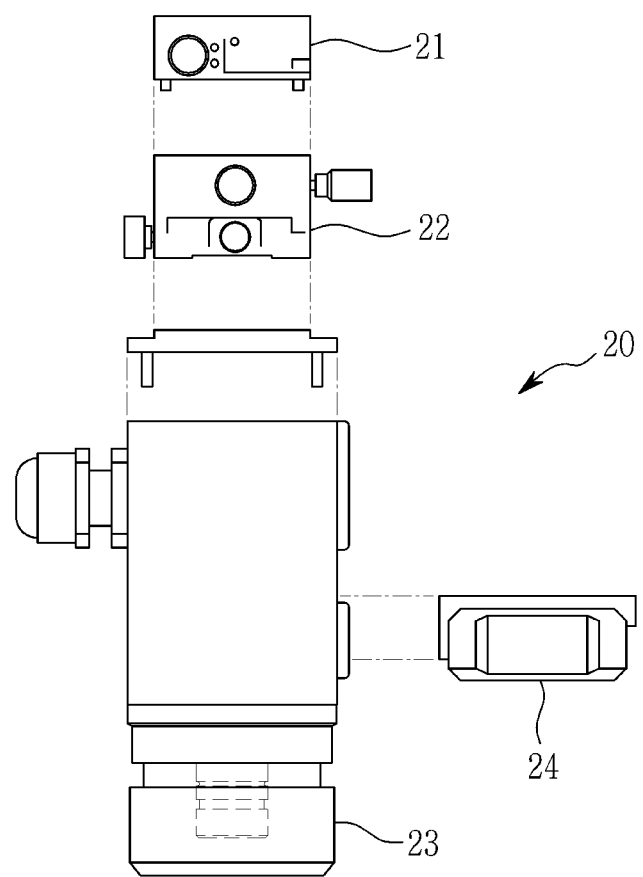
FIG. 2 is an exploded view schematically showing a configuration of a camera module according to an exemplary embodiment of the present disclosure.

FIG. 2 is an exploded view schematically showing a configuration of a camera module according to an exemplary embodiment of the present disclosure.

Referring to FIG. 2, the camera module 20 according to an exemplary embodiment of the present disclosure may include a rotation stage 21, a tilting stage 22, a camera 23, and a measuring device 24.

The rotation stage 21 is attached to a fixture and rotates the camera 23 at a predetermined rotation angle to be fixed.

The tilting stage 22 connects between the rotation stage 21 and the camera 23 and adjusts a 2-axis tilting angle of the camera 23. For example, the tilting stage 22 may tilt the camera 23 in two axis directions.

The camera 23 includes an image sensor 23a and a lens 23b, and may be selected in consideration of a sensing region, an operation speed, a supported protocol, or a cable length. The camera 23 photographs the jig 10 including the clamping unit 12 from the installed position and transmits the photographed inspection image to the vision system 30.

The camera 23 may be provided in plural by considering a photographing region according to the entire size of the jig 10, or may support wide photographing in which a photographing range is widened by extending the number of image sensors in a predetermined direction.

The measuring device 24 is attached to the housing of the camera 23, measures the rotation angle and the tilting angle of the camera 23 initially set through the rotation stage 21 and the tilting stage 22, and stores them in a memory.

When the camera 23 is reinstalled after maintenance, the measuring device 24 measures the rotation angle and the tilting angle of the camera and displays these as numerical values. Through this, the camera 23 may be installed in the same position as the initially set position.

In addition, when the initial setting position of the predetermined camera 23 is changed through test shooting and calibration, the inspection image captured by the camera 23 may be changed, and thus an error in image recognition may occur. Therefore, by allowing the camera to be installed in the same position as the initially set position through the measuring device 24, an error in image recognition may be prevented.

Figure 3:
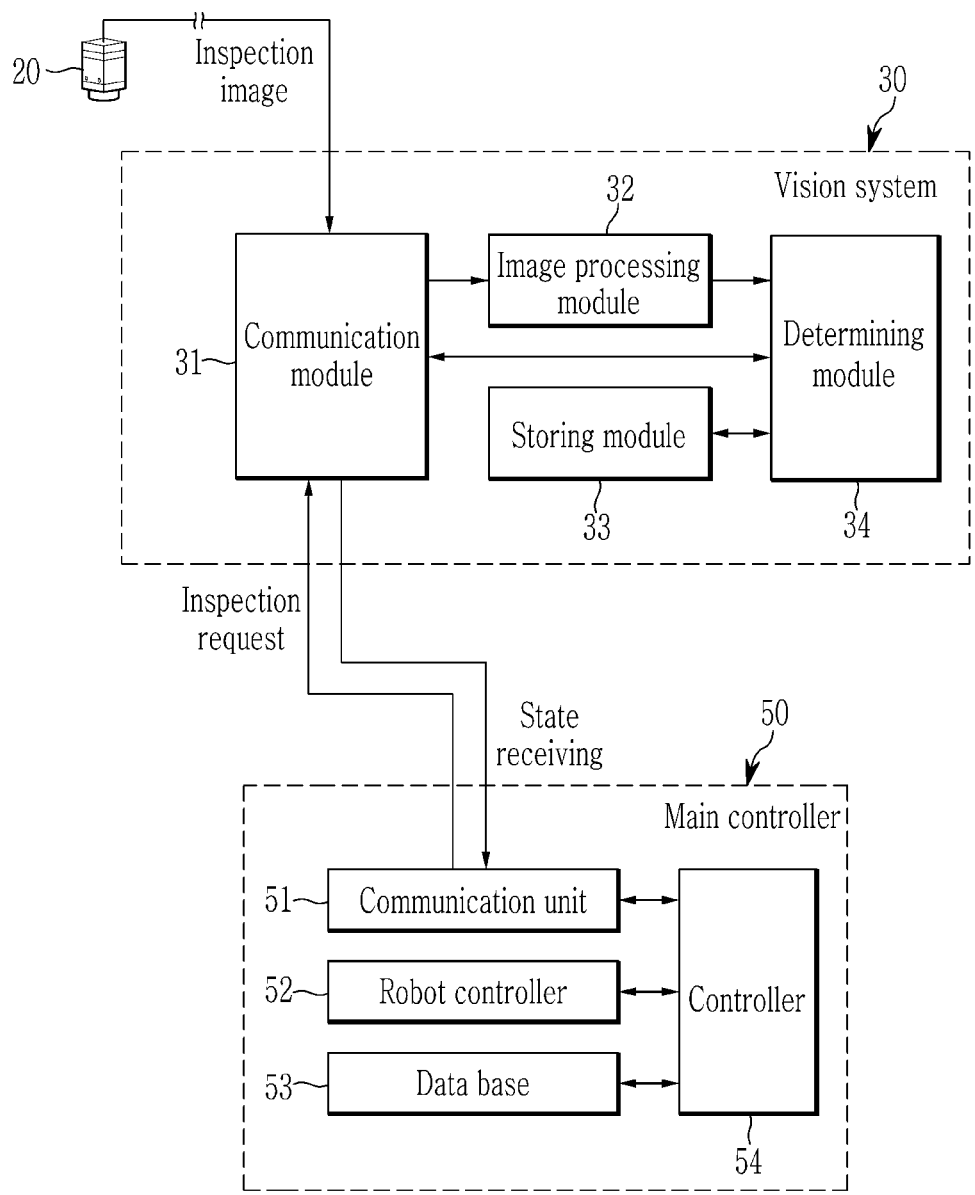
FIG. 3 is a block diagram schematically showing a configuration of a vision system and a main controller according to an exemplary embodiment of the present disclosure.

FIG. 3 is a block diagram schematically showing a configuration of a vision system and a main controller according to an exemplary embodiment of the present disclosure.

Referring to FIG. 3, the vision system 30 according to an exemplary embodiment of the present disclosure includes a communication module 31, an image processing module 32, a storing module 33, and a determining module 34.

The communication module 31 has at least one communication means to communicate with the camera module 20 and the main controller 50.

The communication module 31 may receive the inspection image captured by the camera module 20 by applying an operation signal to the camera module 20 according to the inspection request from the main controller 50.

The communication module 31 may transmit the state information of the jig 10 determined through the analysis of the inspection image to the main controller 50. The state information includes the state in which the component is mounted on the jig 10 and the state (a forward moving state/a backward moving state) of the clamping unit 12.

The image processing module 32 sets the image analysis reference including a reference color of the clamping unit 12 for each vehicle type, an image region for each object, template information defined in each image region, a camera ID, and a jig position (a process work code) from the reference image of the jig 10 taken in advance from the camera module 20 and stores it to the storing module 33. The template information includes two standard templates for determining the forward moving state and the backward moving state based on the image shape of the clamping unit 12. Hereinafter, the reference image is to generate the template information in advance, and is marked separately from the inspection image photographed through the camera module 20 in the actual process.

Figure 4:
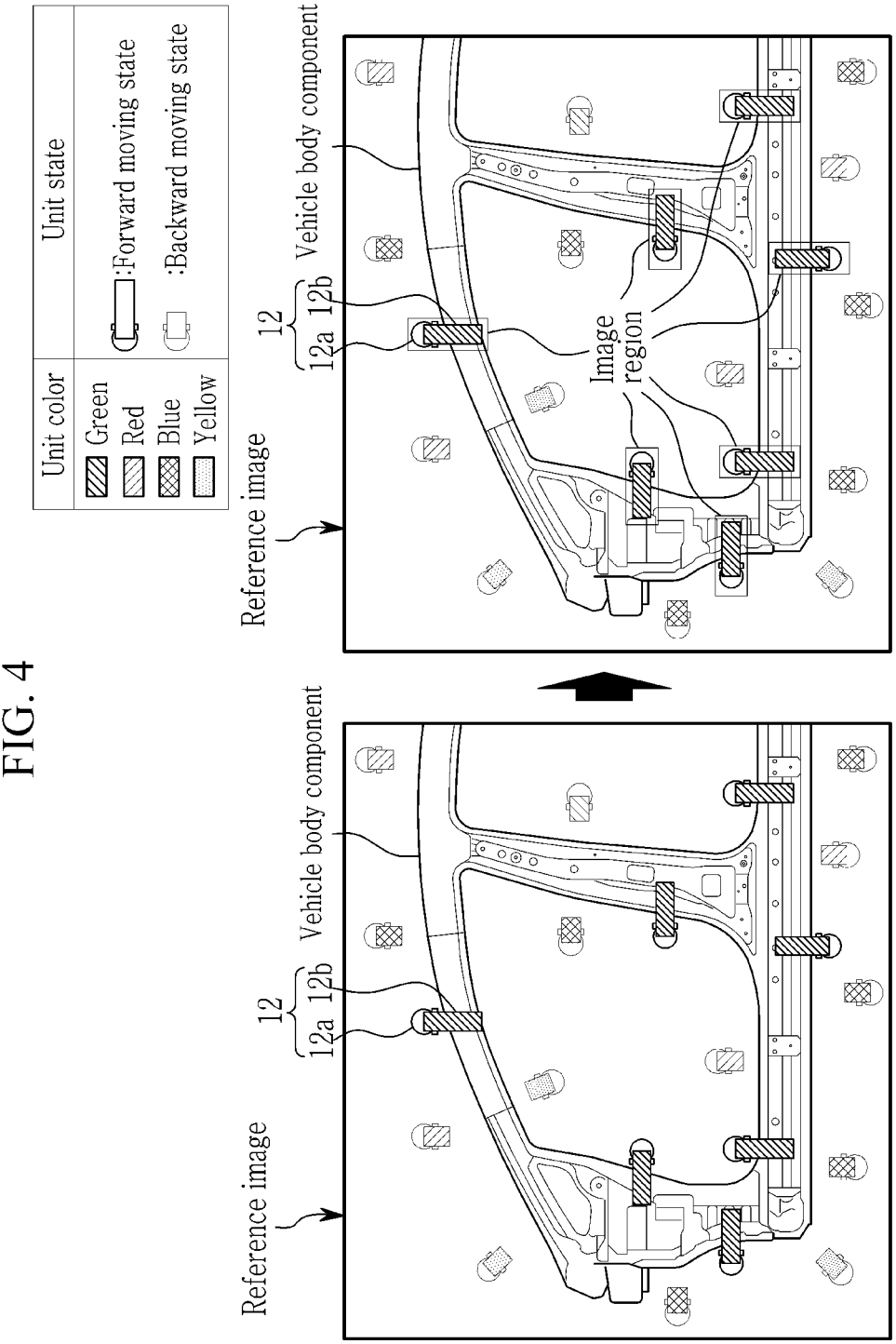
FIG. 4 is a view showing a setting method of an image analysis reference by using a reference image according to an exemplary embodiment of the present disclosure.

FIG. 4 is a view showing a setting method of an image analysis reference by using a reference image according to an exemplary embodiment of the present disclosure.

Referring to FIG. 4, the image processing module 32 according to an exemplary embodiment of the present disclosure shows a process of generating an image analysis reference through the reference image of the jig 10 displayed on a template authoring tool UI of the worker.

Since each clamping unit 12 disposed in the jig 10 is painted with a unique color for each vehicle type, the image processing module 32 applies this to generate the image analysis reference to which the template information according to the color of the clamping unit 12, the vehicle type, and the operating state of the clamping unit 12 is matched in advance.

The image processing module 32 extracts the color of the clamping unit 12 from the reference image displayed on the template authoring tool UI and matches and stores the vehicle type and the component used for each color.

The image processing module 32 sets the image region of a box shape for each clamping unit 12 of the reference image. Since about 40 clamping units 12 are installed in the jig 10, it may take a long time for workers to set up the image regions individually. Therefore, the image processing module 32 may generate the image region of an arbitrary box-shape based on the color of one clamping unit 12 selected by the worker. For example, if the worker selects an arbitrary color in the template authoring tool UI and selects the clamping unit 12 of the corresponding color, the image region of the arbitrary box shape may be generated.

Figure 5:
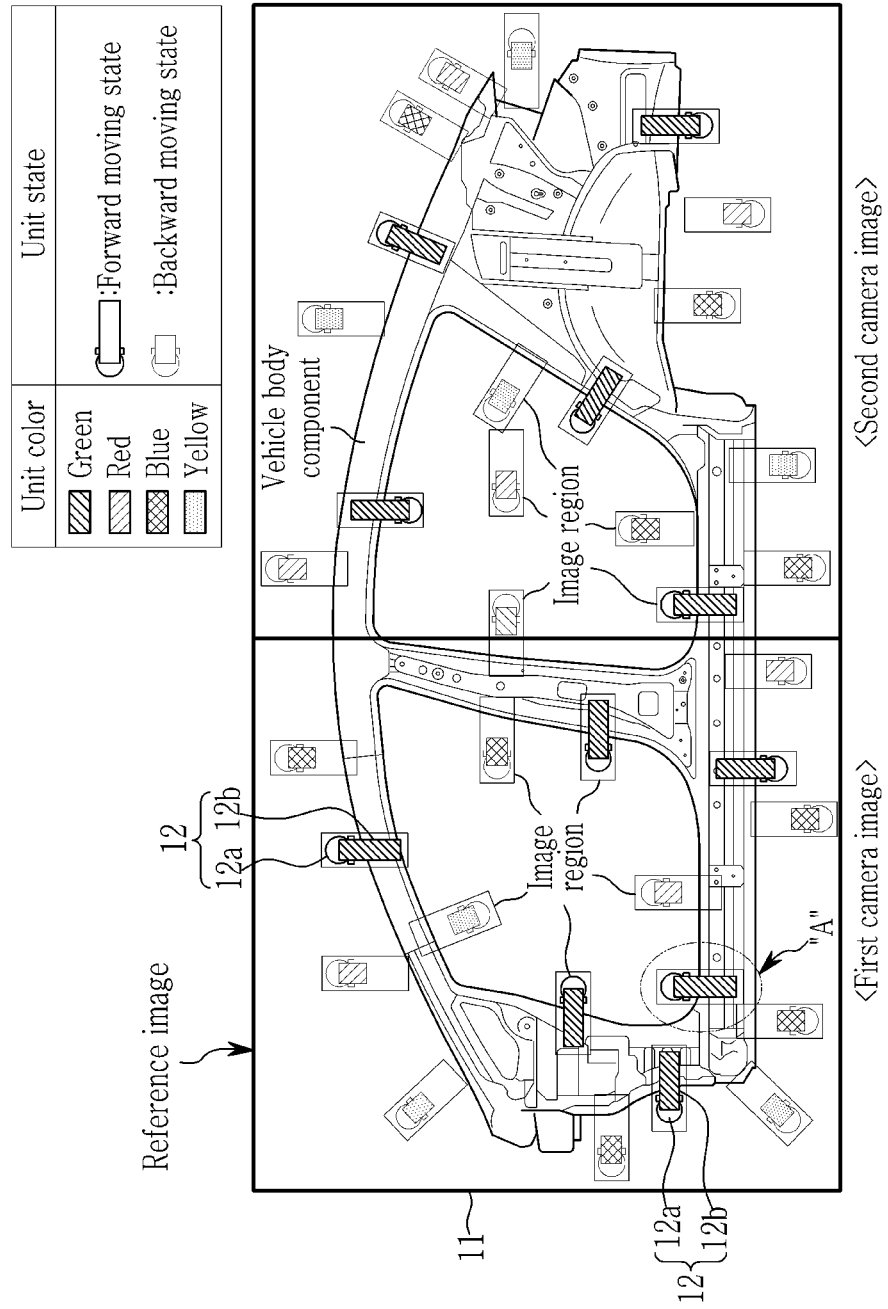
FIG. 5 is a view showing a color and an image region of a clamping unit for each vehicle type according to an exemplary embodiment of the present disclosure.

FIG. 5 is a view showing a color and an image region of a clamping unit for each vehicle type according to an exemplary embodiment of the present disclosure.

Referring to FIG. 5, the image processing module 32 shows the selected state of the image regions of all clamping units 12 for each type and each color of the various vehicles applied to the jig 10 in the entire reference image. At this time, if the first half and the second half of the jig 10 are photographed by two cameras, the image processing module 32 matches the first half image received from the first camera and the second half image received from the second camera to generate the reference image integrated into one.

The image region is set based on the forward moving state of the clamp unit 12, which has a relatively large area, and may be set larger than the contour of the actual clamp unit 12 with a predetermined interval. If the image region is set smaller than the clamping unit 12, the worker may select the corresponding box and adjust the size arbitrarily.

When the image region for each clamping unit 12 is set, the image processing module 32 extracts each image region from the reference image and performs pre-processing work for the image analysis.

Figure 6:
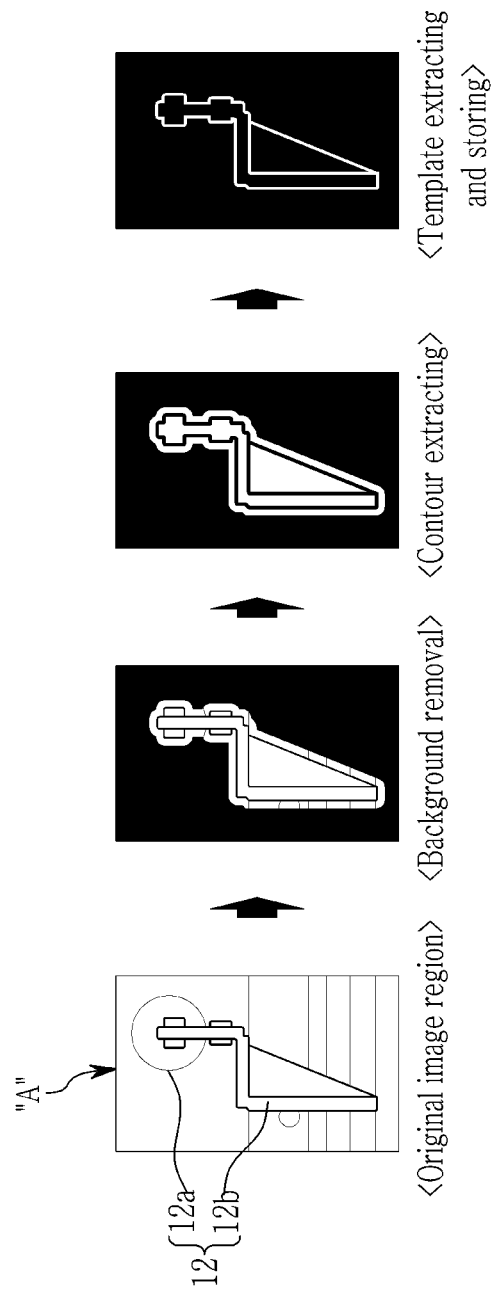
FIG. 6 is a view showing an image processing process for an image region of a clamping unit according to an exemplary embodiment of the present disclosure.

FIG. 6 is a view showing an image processing process for an image region of a clamping unit according to an exemplary embodiment of the present disclosure.

Referring to FIG. 6, it may be explained that the image processing module 32 according to the exemplary embodiment of the present disclosure performs the following image processing work by extracting the image region of the predetermined part "A" in the clamping unit 12 from the reference image in FIG. 5.

When the image region is input, the image processing module 32 eliminates noise and adjusts brightness through the pre-processed work.

The image processing module 32 filters the image region to remove an unnecessary background part, and extracts the contour of the clamping unit 12.

The image processing module 32 stores the contour shape extracted from the image region as the template information of the corresponding clamping unit 12. At this time, the image processing module 32 may match and store the forward moving state template and the backward moving state template for one clamping unit 12.

As such, the image processing module 32 sets the template information for each vehicle type, color, and clamping unit 12 analyzed through the camera ID and the reference image photographed in the jig position in advance as the corresponding image analysis reference and compares it with the inspection image based on this, thereby determining the state of the clamping unit 12.

In addition, the image processing module 32 may identify the vehicle type corresponding to the color of the clamping unit 12 fixing the component, for example, in the case of FIG. 5, it may be confirmed that the vehicle body component of the green vehicle type is mounted.

Meanwhile, FIG. 6 may also be referred to for the image region processing process of the clamping unit 12 extracted from the inspection image of the jig while the actual process line is running.

Referring to FIG. 6, the image processing module 32 extracts the image region of the clamping unit 12 from the inspection image received from the camera module 20 in real time to determine the state of the clamping unit 12 using the vision sensing. Here, the image region extracted from the inspection image is extracted based on the image region position for each predetermined object through the above template authoring tool UI.

The image processing module 32 derives the shape information of the clamping unit 12 based on the contour extracted by processing the image region to compare it with the template of the predetermined image analysis reference. The process of the image processing for the inspection image and each image region of the clamping unit 12 is similar to the template generation method described above.

The image processing module 32 retrieves the template information corresponding to the shape information of the clamping unit 12 derived from the image region from the image analysis reference and compares it pixel-to-pixel to calculate a matching rate (%).

At this time, the image processing module 32 respectively compares the forward moving template and the release template predetermined based on the shape information of one clamping unit 12 to calculate a forward moving matching rate for the forward moving template and a backward moving matching rate for the backward moving template.

The image processing module 32 calculates and stores the matching rate with the shape information of the clamping unit 12 while moving the template over the image region. For example, after overlapping the reference template on the image region, the matching rate may be calculated by moving it in a predetermined spiral path or transferring it in a zigzag path.

The matching rate (%) may be calculated by multiplying a value obtained by dividing the number of a pixels in which the shape information of the clamping unit are matched into the number of pixels of the reference template by 100, as shown in Equation 1 below.

The matching rate (%)=(the number of pixels in which the shape information of the clamping unit are matched/the number of pixels of the reference template)*100    (Equation 1)

The image processing module 32 completes the comparison to the last according to the template movement path, and then transfers the maximum forward moving matching rate and the maximum backward moving matching rate with the highest values to the determining module 34. The maximum forward moving matching rate and the maximum backward moving matching rate are used as comparison values for determining the forward/backward moving state of the clamping unit 12 in the determining module 34.

Figure 7:
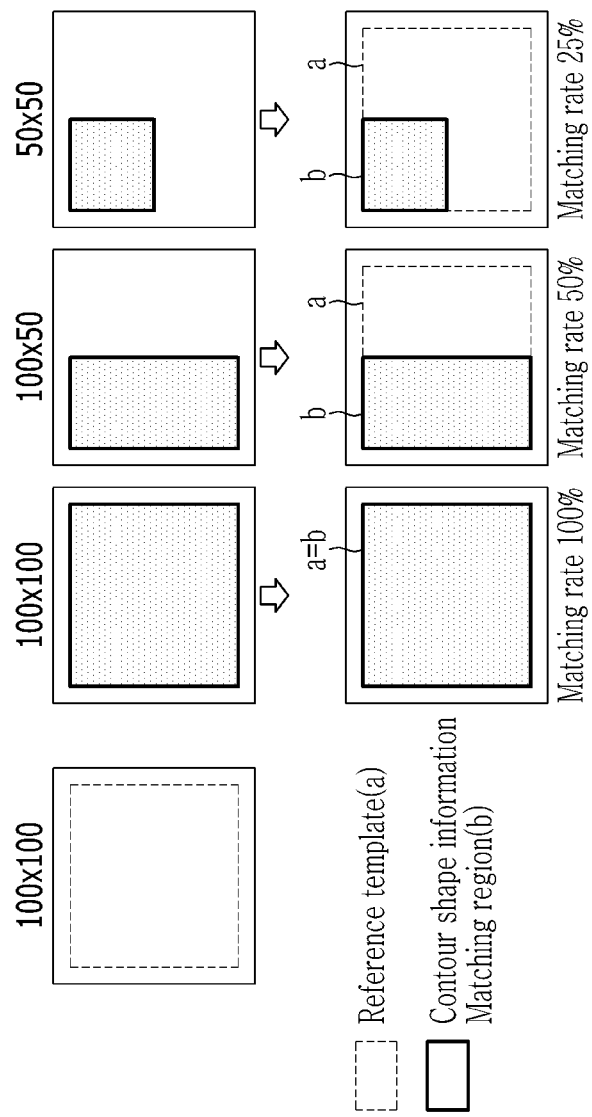
FIG. 7 is a view for explaining a matching rate according to an exemplary embodiment of the present disclosure.

Meanwhile, FIG. 7 shows an example of a matching rate comparison according to an exemplary embodiment of the present disclosure.

Referring to FIG. 7, the reference template a in a certain image region is compared with the matching region b of the shape information extracted from the contour of the inspection image.

A matching rate of 100% means that all pixels in the matching region b of the shape information match the reference template a.

Similarly, a matching rate of 50% means that half of the pixels in the matching region b of the shape information match the reference template a, and a matching rate of 25% means that 1/4 of the pixels match the reference template a.

Since the inspection image received by the camera module 20 contains noise, different data may be received each time when the inspection image is acquired. Therefore, in the state determining of the clamping unit 12, the forward moving state or backward moving state may be determined according to the reference template in which the analyzed maximum matching rate exceeds a certain reference value (e.g., 80%).

In the vision sensing, to simply compare the entire inspection image with the reference image increases computational complexity and time, and analysis accuracy may be deteriorated as the size of the comparison image increases.

Accordingly, the image processing module 32 extracts the image region for each object corresponding to the position of the clamping unit 12 from the inspection image received from the camera module 20 and adjusts the core template information in the extracted image region to store only the necessary information, thereby improving the accuracy of the vision system 30.

In addition, the image processing module 32 may prepare the template information for one jig 10 as a standard and apply it a plurality of common jigs 10, and apply the same vision sensing to the various lines in which the jig 10 moves.

The storing module 33 stores various programs and data for the operation of the vision system 30.

The storing module 33 stores the image analysis reference data for the jig 10 that is predetermined in advance and stores the determining data of the inspection image that is vision-sensed based on this.

The determining module 34 controls the overall operation of each module by executing a program for the operation of the vision system, and includes at least one processor for this.

When the determining module 34 receives an inspection request from the main controller 50, it operates the camera module 20 to photograph the inspection image and operates the image processing module 32 to analyze the inspection image.

The determining module 34 determines the state of the clamping unit 12 based on the predetermined image determining table in the storing module 33 when the maximum matching rate of the clamping unit 12 analyzed by the image processing module 32 is received.

FIG. 8 is a view showing an image determining table according to an exemplary embodiment of the present disclosure.

Referring to FIG. 8, in an image determining table according to an exemplary embodiment of the present disclosure, a forward moving and backward moving determining reference value is set to determine the forward moving state and the backward moving state based on the forward/backward moving template matching rate analyzed in the image region of the clamping unit 12. Hereinafter, the reference value is assumed to be 80%, but the description is not limited thereto and it may be changed.

The clamping unit 12, which is used by linking the clamper 12b to the cylinder 12a, differs greatly in the shape of the forward moving state and the backward moving state in the image region due to their operating characteristics. Therefore, it appears that the backward moving matching rate is low when the forward moving matching rate is relatively high, and the forward moving matching rate is low when the backward moving matching rate is relatively high. And, it is not possible if both the forward moving and backward moving matching rates are high or both are low.

For the example of FIG. 8, the determining module 34 is determined with the forward moving state since the forward moving determining reference value (80%) is exceeded and the backward moving determining reference value (80%) is not exceeded when the matching rate for the forward moving template is 96% and the backward moving template matching rate is 65% as an analysis result of the image region of the forward moving state.

Also, the determining module 34 is determined with the backward moving state since the backward moving determining reference value (80%) is exceeded and the forward moving determining reference value (80%) is not exceeded when the matching rate for the forward moving template is 65% and the backward moving template matching rate is 96% as an analysis result of the image region of the backward moving state.

Also, the determining module 34 is determined with an occurrence of an error when the forward moving and backward moving template matching rates are all below the forward moving and backward moving determining reference value, or conversely, when all exceed the forward moving and backward moving determining reference value as an analysis result of the image region of the forward moving or the backward moving state. At this time, the determining module 34 may diagnose that the template of the corresponding image region (the clamping unit) is defective.

In addition, the determining module 34 may diagnose a position change of the camera module 20 or an inspection image defect when a result of analyzing a plurality of image regions included in one inspection image is determined as an error.

The determining module 34 transmits the forward moving state or the backward moving state according to the determining result to the main controller 50, and when the error occurs, the diagnosis result may be included and transmitted.

Again referring to FIG. 3, the main controller 50 centrally controls all equipment according to the work process assigned to the process line.

The main controller 50 includes a communication unit 51, a robot controller 52, a database (DB) 53, and a controller 54.

The communication unit 51 requests the inspection of the state of the jig 10 to the vision system 30 when necessary for the work process and receives the state information accordingly. Unlike a conventional jig equipped with a large amount of sensors and complex cables that are connected, the cable connection structure according to the sensorless jig 10 is omitted in the communication unit 51 according to an exemplary embodiment of the present disclosure.

The robot controller 52 operates the welding robot 40 that welds the component fixed to the jig 10 with a multi-joint structure according to the applied signal. The robot controller 52 may weld components while moving the position of a welding gun through kinematic attitude control of the welding robot 40.

In addition, the robot controller 52 may be configured in plural according to the number of robots operated in the corresponding process and may control a robot's loading work when a transferring robot that loads the component to the jig 10 is further provided, for example, even if it is omitted in the drawing.

The DB 53 stores a process for the welding work of the components in the process, various programs and software, and various data for equipment control.

The controller 54 controls equipment such as the vision system 30 and the welding robot 40 according to a work logic that is predetermined in the corresponding process.

In the above description, in FIG. 1 and FIG. 3, it was explained that the independent vision system 30 and main controller 50 are separately configured and interlocked with each other. However, an exemplary embodiment of the present disclosure is not limited thereto, and the main controller 50 may be configured as a single computing device or a server, and may be integrated to include the vision system 30.

On the other hand, a welding control method using the multiple vehicle type of jigs according to the implementation of the present disclosure and a multiple vehicle type of jig monitoring method according thereto are described based on the configuration of the above-described image-based jig inspection system with reference to FIG. 9 and FIG. 10 below.

Figure 9:
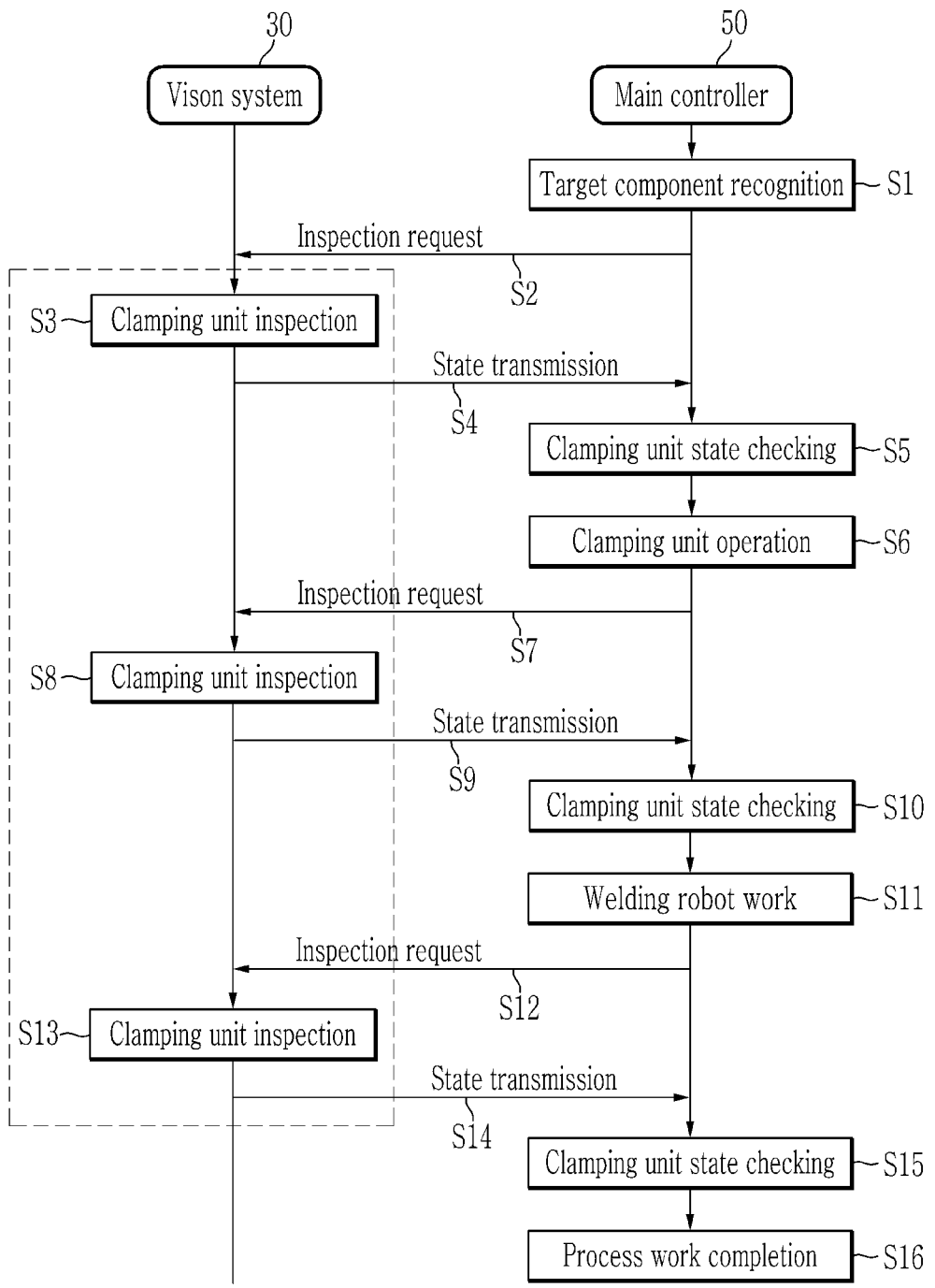
FIG. 9 is a flowchart showing a welding method of utilizing a jig for multiple vehicle types according to an exemplary embodiment of the present disclosure.

FIG. 9 is a flowchart showing a welding method utilizing a jig for multiple vehicle types according to an exemplary embodiment of the present disclosure.

Referring to FIG. 9, the main controller 50 installed in the welding line of the vehicle body factory recognizes a work target component when the multiple vehicle type of jig 10 moves into a correct position in a process initialization state (S1). At this time, the main controller 50 may recognize a unique code (ID) of the work target component assigned to the jig 10 and recognize a vehicle type, a clamping unit color, and a welding work path, which are matched thereto.

The main controller 50 requests the inspection of the jig 10 to the vision system 30 (S2).

When the inspection request is received, the vision system 30 inspects the state of the clamping unit 12 through the analysis of the inspection image obtained by photographing the jig 10 through the camera module 20 (S3), and transmits it to the main controller 50 (S4). At this time, the vision system 30 may determine the state of the clamping unit 12 according to the matching rate by comparing the inspection image with the image analysis reference predetermined in advance.

The main controller 50 checks the state of the clamping unit 12, and if the clamping unit 12 is in the backward moving state in the state where the component is mounted on the jig 10, the main controller 50 operates the clamping unit 12 into the forward moving (S6) and requests the inspection (S7). In this case, the operation of the clamping unit 12 can be applied in various ways according to a predetermined process to the corresponding process. For example, if the component is not mounted and the clamping unit 12 is in the backward moving state, the main controller 50 may operate the clamping unit 12 with the forward moving after the component is loaded on the jig 10.

The vision system 30 checks the clamping unit 12 according to the request (S8) and transmits the determined forward moving state (S9).

When the forward moving state of the clamping unit 12 is confirmed, the main controller 50 operates the welding robot 40 according to the process (S10) to perform the welding work of the fixed component (S11).

When the welding work is completed, the main controller 50 requests the inspection to the vision system 30 (S12), and when the state according to the inspection of the clamping unit of the vision system 30 is confirmed (S13-S15), the process work for the corresponding component is completed (S16).

In the above welding method using the multiple vehicle type of jig, the inspection of the clamping unit of the steps (S3, S8, and S13) is performed according to a monitoring method of the multiple vehicle type of jig of the vision system 30, and the process thereof is described in detail with reference to FIG. 10.

Figure 10:
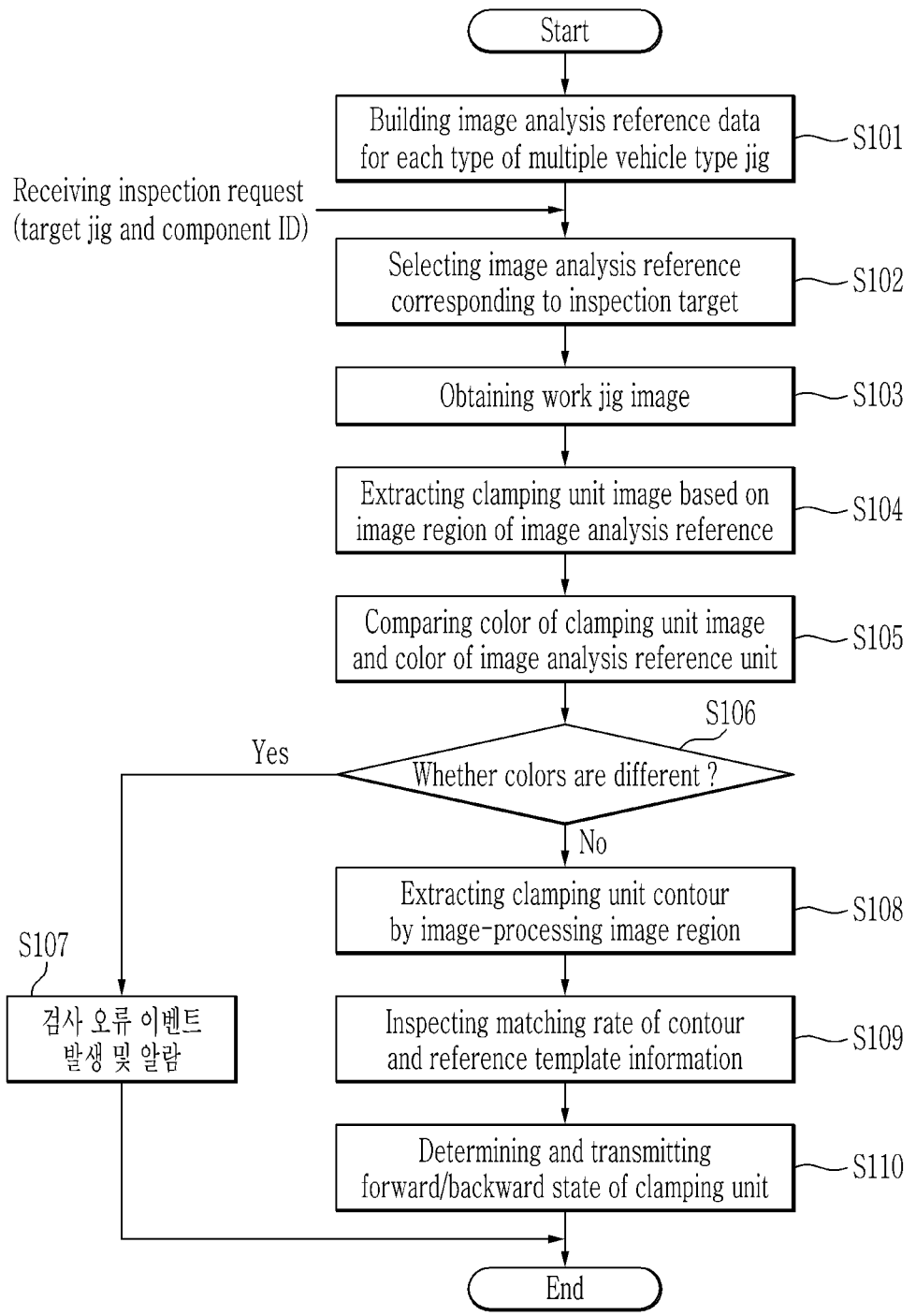
FIG. 10 is a flowchart schematically showing a monitoring method of a jig for multiple vehicle types according to an exemplary embodiment of the present disclosure.

FIG. 10 is a flowchart schematically showing a monitoring method of a jig for multiple vehicle types according to an exemplary embodiment of the present disclosure.

Referring to FIG. 10, the vision system 30 builds image analysis reference data for each type of the multiple vehicle type of jig 10 that is put into the work in advance (S101). The vision system 30 may acquire the reference image for each type of the jig 10 to set the image analysis reference including at least one of the vehicle type, a reference color, the image region, the template information defined in the image region, a camera ID, and a jig position for each clamping unit.

The vision system 30 identifies an inspection target component (ID) according to the inspection request of the jig 10 received from the main controller 50, and selects the image analysis reference corresponding to the component (S102). At this time, the vision system 30 calls the image analysis reference including at least one of the vehicle type matched to the component (ID), the color of the clamping unit, the image region of the clamping unit, and the template information for each image region from the built data and proceeds with the inspection.

The vision system 30 acquires the inspection image photographed through the camera module 20 (S103), and extracts the clamping unit image based on the image region of the image analysis reference from the inspection image (S104).

The vision system 30 compares the color of the clamping unit image with the color of the clamping unit of the image analysis reference (S105), and if two colors are different (S106; Yes), an inspection error event occurs and this is notified to the main controller 50 (S107). Through this, the vision system 30 may alarm a work error in which the inspection target component requested from the main controller 50 and the component actually fixed to the jig 10 are not matched.

On the other hand, if two colors are the same (S106; No), the vision system 30 image-processes the image region to extract the contour of the clamping unit (S108).

The vision system 30 inspects the matching rate by comparing the contour of the clamping unit and the predetermined reference template information to the image analysis reference (S109). At this time, the vision system 30 may calculate the forward moving template matching rate and the backward moving template matching rate, respectively, by comparing the corresponding forward moving template and the backward moving template to the contour of the clamping unit.

If one of the forward moving template matching rate and the backward moving template matching rate exceeds the reference value, the vision system 30 determines this as the state of the clamping unit and transmits it to the main controller 50 (S110). At this time, the vision system 30 may determine the forward moving state when the forward moving template matching rate exceeds the reference value, and conversely, may determine the backward moving state when the backward moving template matching rate exceeds the reference value. However, if both matching rates exceed the reference value or both matching rates do not exceed the reference value, the vision system 30 determines that an error has occurred and may send an alarm regarding this to the main controller 50.

With respect to FIG. 10 above, the jig monitoring method of the multiple vehicle types according to an exemplary embodiment of the present disclosure has been described, but the present disclosure is not limited to the above exemplary embodiment and other various modifications are possible.

For example, in FIG. 10, it was explained that when the inspection request is received, the vision system 30 compares all the forward moving and backward moving states of the clamping unit through the image processing and reports the result according to the state.

However, the present disclosure is not limited thereto, and when the main controller 50 specifies the forward moving state or the backward moving state and requests the inspection, the vision system 30 may inspect only the corresponding state and transmit the result thereof. For example, the vision system 30 may inspect whether the clamping unit is in the forward moving state by analyzing the inspection image of the jig 10 when the inspection request to confirm whether the clamping unit is in the forward moving state is received. Also, in the same way, the inspection to confirm the backward moving state may be performed. This has the advantage of reducing a computational load according to the calculation of the requested matching rate and the image comparison.

As described above, according to an exemplary embodiment of the present disclosure, by implementing a sensorless jig without the conventional sensor and cable configuration and performing the image-based jig test, it is effective in solving an installation space problem of the jig caused by the conventional sensor, an equipment interference problem, a sensor and cable cost problem, a cable damage and defect, maintenance transportation, etc.

In addition, by disposing the clamping unit for each color according to the vehicle type, the vehicle type of the component mounted on the jig may be intuitively identified by the worker and the vision system, thereby preventing inspection errors.

In addition, by extracting the image region of the clamping unit designated for each color from the inspection image of the multiple vehicle type of jig and determining the forward/backward moving states through the pixel matching rate between the contour of the clamping unit and the reference template, there is an effect that the complexity of the image sensing calculation may be reduced.

The above-described exemplary embodiments of the present disclosure can be applied to programs that allow computers to execute functions corresponding to the configurations of the exemplary embodiments of the disclosure or recording media including the programs as well as the method and apparatus. Those skilled in the art can easily implement the applications from the above-described exemplary embodiments of the present disclosure.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:

1. An image-based jig inspection system for inspecting a state of a sensorless jig, comprising:
    a jig configured to fix a component of a vehicle body mounted by a plurality of clamping units;
    a camera module configured to photograph an inspection image of the jig;
    a vision system configured to compare the inspection image with a predetermined image analysis reference to determine a forward moving state or a backward moving state of a respective one of the clamping units;
    a welding robot configured to weld the component; and
    a main controller configured to control the welding robot according to a predetermined process based on state information of the respective one of the clamping units;
    wherein the vision system includes:
        a communication module configured to receive an inspection image photographed by the camera module;
        an image processing module configured to:
            extract shape information of each of the clamping units from the inspection image received from the communication module, and
            compare the shape information of each of the clamping units and predetermined reference template information in the image analysis reference to calculate a forward moving matching rate and a backward moving matching rate of each of the clamping units; and
        a determining module configured to determine the forward moving state or the backward moving state of each of the clamping units by detecting that one of the forward moving matching rate and the backward moving matching rate exceeds a predetermined reference value.

2. The image-based jig inspection system of claim 1, wherein the jig includes:
    the plurality of clamping units disposed on an upper surface of a base;
    a programmable logic controller (PLC) configured to control the component aligned to the clamping units to be fixed or released; and
    a carriage on which the base is movably mounted.

3. The image-based jig inspection system of claim 1, wherein the plurality of clamping units are painted with a unique color according to a vehicle type of an inspection target component.

4. The image-based jig inspection system of claim 1, wherein the camera module includes:
    a camera installed at a vertical position from the jig and photographing an image of the jig;
    a rotation stage rotating and fixing the camera with a predetermined rotation angle;
    a tilting stage connecting between the rotation stage and the camera and adjusting a tilting angle of the camera; and
    a measuring device measuring the rotation angle and the tilting angle of the camera and storing the rotation angle and the tilting angle of the camera to a memory.

5. The image-based jig inspection system of claim 4, wherein the camera is provided with a plurality of image sensors according to a size of the jig, or the number of image sensors is expanded in a predetermined direction to support wide photographing.

6. The image-based jig inspection system of claim 1, wherein the image processing module sets an image analysis reference including at least one of: a vehicle type for each clamping unit, a reference color for each clamping unit, an image region for each clamping unit, template information defined in the image region, a camera ID, or a jig position by obtaining the reference image of the jig in advance.

7. The image-based jig inspection system of claim 1, wherein the image processing module generates an integrated reference image by matching a first half image and a second half image of the jig photographed by a plurality of cameras.

8. The image-based jig inspection system of claim 1, wherein the image processing module matches the vehicle type and the component used for each color of the clamping unit in the reference image through a template authoring tool UI and sets the image region for each clamping unit.

9. The image-based jig inspection system of claim 8, wherein the image processing module filters the image region to remove a background and extracts a contour of each of the clamping units.

10. The image-based jig inspection system of claim 9, wherein the image processing module derives the shape information of each of the clamping units based on the contour and generates the template information including the forward moving state template and the backward moving state template.

11. The image-based jig inspection system of claim 1, wherein the image processing module calculates each matching rate by comparing the template information corresponding to the shape information of each of the clamping units on a pixel-to-pixel basis.

12. The image-based jig inspection system of claim 1, wherein the image processing module calculates the matching rate while overlapping and moving the template information on the image region, and transfers the forward moving matching rate and the backward moving matching rate with maximum values to the determine module.

13. The image-based jig inspection system of claim 1, wherein the determining module determines as the forward moving state if the forward moving matching rate exceeds the forward moving determining reference value and the backward moving matching rate does not exceed the backward moving determining reference value, and determines as the backward moving state if the backward moving matching rate exceeds the backward moving determining reference value and the forward moving matching rate does not exceed the forward moving determining reference value.

14. The image-based jig inspection system of claim 13, wherein the determining module determines that an error occurs when the forward moving matching rate and the backward moving matching rate both exceed the forward moving and backward moving determining reference values or both do not exceed the forward moving and backward moving determining reference values.

* * * * *